United States Patent [19]

Sharkey et al.

[11] 4,032,549

[45] June 28, 1977

[54] REACTIVE LIQUID POLYAMIDES FROM AMINE RESIDUES

[75] Inventors: Hubert J. Sharkey; Robert Allan Winstel, both of Cincinnati, Ohio

[73] Assignee: Emery Industries, Inc., Cincinnati, Ohio

[22] Filed: Mar. 29, 1976

[21] Appl. No.: 671,325

[52] U.S. Cl. ............... 260/404.5; 260/247.2 A; 260/268 PL; 260/293.63

[51] Int. Cl.[2] ............... C09F 5/00; C07D 295/00

[58] Field of Search ............... 260/404.5, 247.2 A, 260/268 PL, 293.63

[56] References Cited

UNITED STATES PATENTS

| | | | |
|---|---|---|---|
| 2,767,089 | 10/1956 | Renfrew et al. | 260/404.5 X |
| 2,886,543 | 5/1959 | Peerman et al. | 260/404.5 X |
| 3,242,141 | 3/1966 | Vertnik et al. | 260/404.5 X |
| 3,249,629 | 5/1966 | Rogier | 260/404.5 |
| 3,396,180 | 8/1968 | Floyd et al. | 260/404.5 |
| 3,622,684 | 11/1971 | Drawert et al. | 260/404.5 |
| 3,630,904 | 12/1971 | Musser | 260/268 PL |
| 3,652,469 | 3/1972 | Glaser et al. | 260/404.5 X |
| 3,776,865 | 12/1973 | Glaser et al. | 260/404.5 X |

*Primary Examiner*—Winston A. Douglas
*Assistant Examiner*—John F. Niebling
*Attorney, Agent, or Firm*—Gerald A. Baracka; John D. Rice

[57] ABSTRACT

This invention relates to reactive liquid polyamides derived from poly-basic acids and amine residues obtained as by-products from the process for the hydrogenation of adiponitrile to hexamethylenediamine. By use of these amine residues it is possible to obtain liquid polyamide products having low amine values and manageable viscosities. The liquid reactive polyamides are useful for a variety of applications, for example, they can be blended with thermoplastic polyamide resins to impart desirable properties thereto.

9 Claims, No Drawings

REACTIVE LIQUID POLYAMIDES FROM AMINE RESIDUES

BACKGROUND OF THE INVENTION

Reactive liquid polyamides derived from fatty polymer acids and various polyamines containing three or more amine groups are known. These products form linear condensation products which contain unreacted primary and secondary amine groups making them extremely useful as co-reactants with epoxy resins and phenol-formaldehyde resins. The utility of liquid reactive fatty polyamides is also well documented in the prior art.

To obtain liquid polyamides utilizing polyamines and polymeric fatty acids it is necessary to employ either a large excess of the polyamine or use a polyamine having very high amine functionality or both. In any event to obtain a liquid product with manageable viscosity the resulting polyamide will have a high amine value which is not desirable for all applications. For example, when one equivalent dimer acid is reacted with 2.4 equivalents diethylenetriamine the resulting polyamide has a very useful viscosity of about 13 poise at 75° C but the amine value is about 200–220. Reducing the amount of diethylenetriamine to about 1.6 equivalents lowers the amine value of the product to 90 to 95 but at the same time increases the viscosity so that to obtain the same viscosity it is necessary to heat the polyamide product to 150°–160° C. This complicates handling, requires more elaborate equipment for pumping and/or heating, and otherwise increases the processing costs.

While the presence of free amine groups in the polymer chain and pendant thereto is required for reactivity of these polyamide systems, it would be highly desirable if liquid reactive polyamides having reduced amine functionality were available. This feature would increase the utility of these products and make them particularly useful for blending with thermoplastic polyamide resins. Such blending procedures are finding widespread acceptability throughout the industry as a means of conveniently and economically altering the physical and chemical properties of thermoplastic polyamide materials. It is possible using such blending procedures to lower the softening point, reduce the melt viscosity and, in some cases, improve the adhesion characteristics of the material without detracting from the other desirable properties of the system. If liquid polyamides having reduced amine functionality were available it would increase the flexibility of such blending procedures and make it possible to obtain a greater variety of polyamide blends having useful properties.

It has now quite unexpectedly been found that liquid reactive polyamides having amine values less than 200 are obtainable by reacting polybasic acids and certain amine residues which will be more fully disclosed below. Surprisingly it has been found that typical products of this invention have manageable viscosities of 25 poise or below at 100° C or lower with amine values less than 140. This feature is highly desirable since 25 poise is considered to be about the upper limit of viscosity if a product is to be handled using gravity flow or slight pressurization. At higher viscosities more elaborate transfer means, e.g. gear pumps, are required or the product must be heated to a higher temperature to reduce the viscosity — an approach which is undesirable because of the increased energy consumption and also because of the tendency of these materials to discolor when exposed to higher temperatures.

SUMMARY OF THE INVENTION

This invention relates to novel liquid reactive polyamides having manageable viscosities at amine values less than 200. These products typically have viscosities in the range 1–25 poise at 100° C or lower. The are obtained by the reaction of an amine residue obtained as a distillation cut from the adiponitrile hydrogenation process and an aliphatic or cycloaliphatic polybasic acid having 18 up to 72 carbon atoms and 2 to 4 carboxyl groups. Preferably the polybasic acid component is a polymerized fatty acid obtained by the polymerization of an unsaturated monocarboxylic acid containing 16 to 26 carbon atoms. The useful amine residues contain 60–95, preferably 67–83, wt. percent 1,2-diaminocyclohexane; 4–20, preferably 6–14, wt. percent 2-methylpentamethylenediamine; 3–15, preferably 5–11, wt. percent hexamethylenediamine; and 4–10, preferably 5–9, wt. percent 2-(aminomethyl)-cyclopentylamine. Additional carboxylic acid and amine components may also be present and can constitute up to about 20 equivalent percent of the total respective components. The equivalents ratio of the amine and carboxyl components range from 1.25:1 up to 4:1.

DETAILED DESCRIPTION

The reactive liquid polyamides of the present invention are obtained by the reaction of a polybasic acid with an excess of an amine residue at atmospheric pressure.

The Amine Residue

An amine residue obtained as a distillation cut from the process for the catalytic hydrogenation of adiponitrile to hexamethylenediamine (HMDA) is employed for the preparation of the reactive liquid polyamides. The catalytic hydrogenation of the adiponitrile is extensively used throughout the industry for the preparation of HMDA and such processes are described in U.S. Pat. Nos. 3,235,600, 3,471,563 and 3,917,707 and in numerous other patents and publications. One of the distillation by-products obtained from this process is an amine residue which is a mixture of primary products with 1,2-diaminocyclohexane (DCH) being the predominant diamine component present in the mixture. Other diamine components typically making up this mixture are hexamethylenediamine, 2-methylpentamethylenediamine (MPMDA) and 2-(aminomethyl)-cyclopentylamine (ACPA). Small amounts of still other nitrogen-containing compounds, such as hexamethyleneimine, may also be present in the mixture.

Since the amine residue is a distillation cut obtained from the process (the forecut obtained prior to removal of high purity HMDA) considerable variation is possible in the compositional makeup of the residue. The ratio of the principal diamine components will also vary depending on the conditions employed for the process, purity of the adiponitrile, etc. For the purpose of this invention, however, useful amine residues will contain from about 60 to 95 weight percent DCH, 4 to 20 weight percent MPMDA, 3 to 15 weight percent HMDA, 4 to 10 weight percent ACPA and up to about 7 weight percent other nitrogen-containing by-products. The amine residue is typically a fluid product ranging in color from light straw to black and boiling in the range 180°to 210° C at atmospheric pressure. The amine residue has a neutral equivalent in the range 55–85 and, more preferably, in the range 57 to 68. The neutral equivalent is conventionally determined by titration with a standardized mineral acid using bromocresol green indicator. Preferably the amine residues contain from about 67 to 83 weight percent DCH, 6 to 14 weight percent MPMDA, 5 to 11 weight percent HMDA, 5 to 9 weight percent ACPA and less than 5 weight percent other nitrogen-containing by-products.

While it is not necessary, the amine residue may be distilled prior to use for the preparation of the liquid reactive polyamides to remove water and undesirable color bodies. A typical stripping procedure is conducted to a maximum temperature of about 220° C at atmospheric pressure. After removal of any water present in the residue, the mixed diamine product is typically collected in the temperature range 140° to 220° C and the minimal pot residue discarded. Useful reactive liquid polyamides are obtainable using amine residues which have not been further stripped, i. e. used as obtained directly from the adiponitrile hydrogenation process.

The Polybasic Acids

Polybasic acids useful for the preparation of the reactive liquid polyamides of this invention are aliphatic or cycloaliphatic hydrocarbon acids having 18 up to about 72 carbon atoms and 2 to 4 carboxyl groups per molecule. The acids may be straight-chain or branched with one or more alkyl groups and the carboxyl groups can be located in terminal positions or randomly throughout the molecule. While the useful polybasic acids can contain from about 18 to 72 carbon atoms, more preferably, they are $C_{21-54}$ acids or mixtures thereof. The high molecular weight polybasic acids are typically obtained as mixtures. They generally contain some monobasic acids formed as reaction intermediates or resulting from incomplete reaction, however, the monobasic acid content will usually not exceed about 15% by weight of the acid mixture and more generally will be less than 10%.

Polybasic acids useful for this invention are obtainable employing conventional methods known to the industry. The acids may be obtained by the oxidation of hydrocarbons, for example, by ozonolysis of $\alpha,\Omega$-unsaturated hydrocarbons or other di- or multi-olefinic materials or by catalytic oxidation of saturated and/or unsaturated hydrocarbons. Also, it is possible to obtain suitable polybasic acids by oxidation of methyl- or formyl-branched acids, such as isostearic acid or formylstearic acid. Carboxystearic acids such as heptadecane-1,9dicarboxylic acid, heptadecane-1,8-dicarboxylic acid, as well as other isomeric acids, are produced in this manner. Useful polybasic acids are also formed by the addition of acrylic acid or methacrylic acid and a monobasic acid containing conjugated unsaturation (e.g. linoleic acid). When linoleic acid (9,11-octadecadienoic acid) and acrylic acid are reacted, a dicarboxylic adduct having the following type structure is obtained.

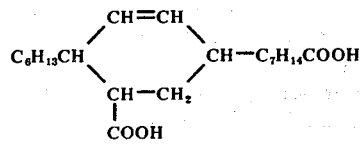

An especially useful method for producing the polybasic acids utilized in the present invention is by the polymerization of unsaturated monocarboxylic acids containing from about 16 to 26 carbon atoms, such as, for example, oleic acid, linoleic acid, ricinoleic acid, elaidic acid, linolenic acid and eleostearic acid. The acids produced in this manner are generically referred to as polymeric fatty acids or polymer acids and more specifically designated as dimer acid, trimer acid, tetramer acid, etc. depending on the degree of polymerization.

Methods known for the preparation of polymer acids include (a) treatment of unsaturated fatty acids with acid catalysts such as HF, $BF_3$, $AlCl_3$, and the like; (b) treatment of unsaturated fatty acids with electrical discharges; (c) treatment of fatty acids with peroxides; (d) thermal treatment of fatty acids containing unsaturation and (e) heating unsaturated fatty acids in the presence of treated or untreated clays. The above procedures as well as other less frequently used techniques are well known and described in the literature.

Dimer acids (polymer acids obtained by reacting two fatty molecules) of $C_{18}$ acids, such as oleic acid, linoleic acid or mixtures thereof (e.g. tall oil fatty acid), are especially useful and advantageously employed for reaction with the amine residues to obtain the reactive liquid polyamides. Polymer acids having as their principal component $C_{36}$ dimer acid are commercially available under the trademark "Empol" and have the following specifications:

| Acid value | 180–215 |
|---|---|
| Saponification value | 190–215 |
| Neutral equivalent | 265–310 |

$C_{36}$ dimer acids containing less than 25 wt. percent trimer or higher polymer acids and less than 1 percent by weight monobasic acids are especially useful for the present invention. If desired, polymer acids containing unsaturation can be hydrogenated prior to use.

The novel and useful polyamides of this invention may be prepared using conventional methods in which the amine and carboxylic acid components are reacted in proportions so that there is an equivalents excess of amine component in the reaction mixture. The equivalents ratio of amine component to carboxylic acid component will range from 1.25:1 to 4:1 and, more preferably, will be in the range 1.50:1 to 2.5:1.

Additional Reactants

While extremely useful products can be obtained employing the above-described amine residues and polybasic acids as the sole components it is also possible to include one or more additional amine or carboxyl-containing compounds in the reaction. In this way it is possible to further alter the desirable properties of the liquid reactive polyamide systems of this invention.

While the polybasic acid will constitute from about 70 to 100 equivalent percent of the total carboxylic acid used up to about 30 equivalent percent of one or more aliphatic or cycloaliphatic carboxylic acids containing from 2 to 28 carbon atoms and, more preferably, from 6 to 18 carbon atoms can also be employed. The carboxylic acids can be mono- or dicarboxylic acids, be branched or straight-chain (unbranched) and are hydrocarbon acids, i.e. besides the carboxyl group(s) have not other functionality. Since the monocarboxylic acids function as chain stoppers they are sometimes used to vary the molecular weight of the polyamides. Whereas these additional carboxylic acid components can range from 0 to 30 equivalent percent they more generally constitute less than 15 equivalent percent of the total carboxylic acid charge. To illustrate the various mono- and dicarboxylic acid components which can be employed the following are mentioned: 2-ethylhexoic acid, pelargonic acid, lauric acid, myristic acid, palmitic acid, stearic acid, linoleic acid, oleic acid, linolenic acid, coco fatty acids, tall oil fatty acids, erucic acid, oxalic acid, malonic acid, succinic acid, glutaric acid, adipic acid, azelaic acid, sebacic acid, brassylic acid, dodecanedioic acid and the like. Aliphatic monocarboxylic acids containing 14 to 18 carbon atoms are especially useful.

In addition to the aforementioned amine residues which can constitute from about 70 to 100 equivalent percent of the total amine present in the reaction mixture, up to about 30 equivalent percent of one or more additional amine compounds can be included. Aliphatic, aromatic and heterocyclic amines containing from 2 up to 20 carbon atoms and including monoamines, diamines and amines having greater functionality can generally be used. These amine compounds can be straight-chain or unsubstituted or the may be branched or contain substituents on the ring. Typical mono-amines include morpholine and the higher aliphatic (above about $C_8$) amines, such as pelargonyl amine, stearyl amine, and complex amines, such as ethanol amine, diethanolamine and the like. Representative diamines include ethylene diamine, hexamethylenediamine, propylenediamine, xylenediamine, piperazine, aminoethylpiperazine, bis(aminoethyl) benzene, methylene- or isopropylidine-biscyclohexylamine, 1,4-piperazine-bispropylamine and the like. Also useful as dipiperidyl type diamines such as 1,3-di(4-piperidyl) propane, 1,4-di(4-piperidyl)butane and 1,2-di(4-piperidyl)-ethane and N-substituted piperazine or dipiperidyl type diamines wherein the substituent consists of an aminoalkyl or hydroxyalkyl radical containing from 1 to 4 carbon atoms such as N-aminoethylpiperazine, N-aminopropylpiperazine and the like. Especially useful amines having functionality greater than two are diethylenetriamine and triethylenetetramine. As indicated the additional amine components can constitute from 0 up to 30 equivalent percent of the total amine component present in the reaction mixture, however, the additional amine compound(s), if present at all, will preferably constitute less than about 15 equivalent percent particularly if monoamines are used. When monoamines are employed in combination with the amine residue they will typically be used at levels not to exceed 10 equivalent percent.

Preparation of the liquid reactive polyamides is accomplished using conventional and well known procedures. The reaction is carried out by heating the amine and carboxylic components in a suitable reactor arranged to permit water formed during the reaction to be distilled from the reaction mixture and removed from the system. Generally, this is achieved by use of a reflux condenser fitted with a suitable trap for separating and collecting the aqueous distillate. All the reactants may be added as a unit charge but in order to avoid excessive foaming generally the carboxylic acid will first be charged to the reactor, heated to about 160° C and the amine added slowly with agitation. To complete the reaction (obtain an acid value less than one) the temperature will generally be raised to about 220°–240° C. Temperatures much in excess of 250° C should be avoided. While the reaction is usually conducted at atmospheric pressure a vacuum can be applied particularly when the reaction is conducted at lower temperatures. Nitrogen or another inert gas can be bubbled through or passed over the reaction mixture during the course of the reaction. While it is not necessary, a small amount (generally in the order of 0.05 to 0.5 percent by weight) of phosphoric acid or an alkali metal phosphate such as $Na_3PO_4$, $Na_2HPO_4$ and $NaH_2PO_4$ can be added to the reaction mixture as a metal scavenger to improve the color of the resulting liquid reactive polyamide. If such compounds are included in the reaction mixture the salts are remoed from the polyamide by filtration at the end of the reaction, otherwise, the reaction mixture requires no special processing and can be discharged directly from the reactor and used as such.

The products of this invention can be generally characterized as low amine value, liquid polyamides having manageable viscosities at 100° C or lower. More specifically, these polyamides have amine values less than 200, acid values less than 5 and viscosities in the range 1–80 poise at 100° C. Preferably, these products have acid values less than 2, amine values less than 140 and a viscosity of 1–25 poise at 100° C or lower.

The invention is more fully illustrated by the following examples. All parts and percentages in these examples are on a weight basis unless otherwise indicated.

EXAMPLE I

One equivalent (286 grams) dimer acid (Empol 1016 Dimer Acid — 87% $C_{36}$ dibasic acid and 13% $C_{54}$ tribasic acid) was charged to a glass reactor fitted with a stirrer, thermometer, $N_2$ inlet and condenser/trap assembly and heated to about 160° C under a nitrogen atmosphere. 1.6 Equivalents (94 grams) of a mixed amine residue (neutral equivalent 58.75) obtained as a distillation byproduct from the process for the hydrogenation of adiponitrile to hexamethylenediamine and having the following approximate composition

75% DCH
10% MPMDA
8% HMDA
7% ACPA was then slowly charged to the reactor with agitation. When the addition was complete the temperature was gradually raised to 240° C over a period of about 2 hours during which time the theoretical amount of water and about 2.5 grams amine products (predominantly DCH) were collected.

The amine value of the reaction mixture at this point was 87 and the acid value was negligible. To compensate for the amine removed with the water about 3 grams of the amine residue was then added and the reaction continued for another hour. The polyamide product was then cooled and discharged. The amine value of the final product was 92.5 and the clear, bright amber polyamide had a 100° C viscosity of 19.5 poise.

EXAMPLE II

Example I was repeated except 2 equivalents (117 grams) of the amine residue was used. The reaction mixture was maintained at 160° C for 2 hours and the temperature was then raised to about 230° C to complete the reaction. The resulting liquid product (zero acid value) had an amine value of 122. The 100° C viscosity was less than the viscosity of the polyamide of Example I. At 75° C the viscosity of the product was still a very acceptable 45.4 poise. Similar results are obtained using a polymerized fatty acid product containing 95% or more $C_{36}$ dibasic acid. Also, similar results are obtained using a different cut of the amine residue containing less DCH and proportionately more of the MPMDA, HMDA and ACPA components.

EXAMPLE III

To demonstrate the ability to modify the reactive liquid polyamides of this invention by incorporating a small amount of another carboxylic reactant the following experiment was conducted. 1.65 Equivalents (97 grams) mixed amine residue was added to a mixture of 0.8 equivalents (230 grams) of the dimer acid and 0.2 equivalents (56 grams) of a mixed acid product (acid value 202) containing about 75% oleic acid and 11% palmitoleic acid with the remainder of the acids being primarily myristic, palmitic, margaric, myristoleic and linoleic. The temperature of the reaction mixture was maintained at 170° C for 2 hours then at 200–240° C for an additional 2 hour period before increasing to 260° C to remove the final traces of water. The polyamide (amine value 92) was cooled and discharged from the reactor. The viscosity of the product was less than 20 poise at 100° C. Even at 75° C the viscosity was still a very acceptable 33 poise. Virtually the same results are obtained using essentially pure oleic acid.

EXAMPLE IV

Example III was repeated using 1.8 equivalents of the amine residue. The resulting liquid reactive polyamide had zero acid value and an amine value of 115. The very fluid product had viscosities of 17 poise and 8.5 poise at 75° C and 85° C, respectively.

EXAMPLE V

A liquid reactive polyamide was prepared on a larger scale following the procedure of Example I except that 1.65 equivalents amine residue was used per equivalent dimer acid. Also, a small amount of mixed alkali metal phosphates was added as a metal scavenger. To remove metal salts from the reaction mixture at the end of the reaction the product was filtered at about 100° C. The final product had negligible acid value, amine value of 95, Gardner color of 6 and 100° C viscosity of about 18 poise. To demonstrate the utility of liquid polyamide products of this invention and their compatibility with other polyamides, 10 parts of the liquid polyamide and, 90 parts of a commercially available thermoplastic polyamide resin (acid value 7.4; amine value 0.4; softening point 167° C), a commonly used adhesive resin for bonding leather in shoe construction, were melt blended to obtain a useful product having an acid value of 6.8 and amine value of 6.4. The 190° C viscosity of the resulting resin was 48 poise less than the viscosity of the original resin at the same temperature. Also the softening point was lowered about 10° C. A blend of 75 parts of the solid resin and 25 parts liquid polyamide had a softening point of 154° C and 190° C viscosity of 30 poise.

In a similar manner 80 parts Emerez 1568, a thermoplastic polyamide resin useful as an adhesive for bonding plasticized vinyl and neoprene, was blended with 20 parts of the liquid polyamide to reduce the viscosity and lower the softening point of the resin. The resulting polyamide blend had a softening point of 115° C and 190° C viscosity of 59 poise while still exhibiting acceptable adhesive properties.

The liquid reactive polyamide (15 grams) was mixed with 5 grams of a liquid epoxy resin (Epon 828) at 80° C and allowed to cure at room temperature overnight. The cured product had acceptable flexibility and could be used for encapsulation and similar applications. An epoxy coating was laid down with a No. 28 wire wound applicator rod and allowed to dry and cure at room temperature for 3 days. The epoxy resin (Epon 1001) and polyamide were both dissolved in xylene (75% solids) and equal parts of these solutions combined and used to form the one mil dry film. When the cured film was treated with boiling isopropanol for about one hour the film remained intact and flexible.

EXAMPLE VI

One equivalent of a $C_{36}$ dibasic acid was reacted with 1.5 equivalents amine residue and 0.15 equivalent diethylene triamine for about 6 hours at a maximum temperature of 220° C. The resulting polyamide had an acid value of 4.6, amine value of 81 and viscosity of 20 poise at 110° C.

We claim:

1. A liquid reactive polyamide composition having an amine value less than 200 and a 100° C viscosity in the range 1–80 poise comprising the reaction product of:
    a. 70 to 100 equivalent percent of an amine residue obtained from the process for the hydrogenation of adiponitrile to hexamethylene diamine and containing 60 to 90 weight percent 1,2-diaminocyclohexane, 4–20 weight percent 2-methylpentamethylenediamine, 4 to 10 weight percent 2-(aminomethyl)-cyclopentylamine and up to 7 weight percent other nitrogen-containing by-products;
    b. 70 to 100 equivalent percent of a polybasic acid which is a branched or straight-chain, aliphatic or cycloaliphatic acid having 18 to 72 carbon atoms and 2 to 4 carboxyl groups;
    c. 0 to 30 equivalent percent of a branched or unbranched, aliphatic or cycloaliphatic mono- or dicarboxylic acid containing 2 to 28 carbon atoms; and
    d. 0 to 30 equivalent percent of a mono- or polyfunctional aliphatic or aromatic amine containing 2 to 20 carbon atoms of heterocyclic amine selected from the group consisting of morpholine, piperazine, aminoethylpiperazine, 1,4-piperazine-bis-propylamine, 1,3-di(4-piperidyl)propane, 1,4-di(4-piperidyl)butane, 1,2-di(4-piperidyl)ethane, N-aminoethylpiperazine and N-aminopropylpiperazine.

2. The polyamide composition of claim 1 wherein the amine residue contains 67 to 83 weight percent 1,2-diaminocyclohexane, 6 to 14 weight percent 2-methylpentamethylenediamine, 5 to 11 weight percent hexamethylenediamine, 5 to 9 weight percent 2-(aminomethyl)cyclopentylamine and less than 5 weight percent other nitrogen-containing by-products and the polybasic acid is a polymerized fatty acid obtained by the polymerization of an unsaturated monocarboxylic acid containing from 16 to 26 carbon atoms.

3. The polyamide composition of claim 2 wherein the polybasic acid is a $C_{36}$ dimer acid containing less than 25 weight percent trimer or other polymer acids and less than 10 weight percent monobasic acids.

4. The polyamide composition of claim 3 which has an acid value less than 2, an amine value less than 140 and a viscosity of 1-25 poise at 100° C or lower.

5. The polyamide composition of claim 1 wherein the polybasic acid contains from 21 to 54 carbon atoms and less than 15% by weight monobasic acid, and containing 15 equivalent percent or less (c) having 6 to 18 carbon atoms and 15 equivalent percent or less (d).

6. The polyamide composition of claim 5 which has an amine value less than 140 and viscosity of 1 to 25 poise at a temperature of 100° C or lower.

7. The polyamide composition of claim 6 wherein (c) is an aliphatic monocarboxylic acid containing 14 to 18 carbon atoms and (d) is a diethylenetriamine or triethylenetetramine.

8. The polyamide composition of claim 7 wherein the amine residue contains 67 to 83 weight percent 1,2-diaminocyclohexane, 6 to 14 weight percent 2-methylpentamethylenediamine, 5 to 11 weight percent hexamethylenediamine, 5 to 9 weight percent 2-(aminomethyl)-cyclopentylamine and less than 5 weight percent other nitrogen-containing by-products and the polybasic acid is a polymerized fatty acid obtained by the polymerization of an unsaturated monocarboxylic acid containing 16 to 26 carbon atoms.

9. The polyamide composition of claim 8 wherein the polybasic acid is a $C_{36}$ dimer acid containing less than 25 weight percent trimer or other polymer acids and less than 10 weight percent monobasic acids and has an acid value of 180-215, saponification value of 190-215 and neutral equivalent of 265-310.

* * * * *

UNITED STATES PATENT OFFICE
CERTIFICATE OF CORRECTION

Patent No. 4,032,549            Dated June 28, 1977

Inventor(s) H. J. Sharkey and R. A. Winstel

It is certified that error appears in the above-identified patent and that said Letters Patent are hereby corrected as shown below:

On the front page of the Patent, line 2 of the ABSTRACT, "poly-basic" should read ---polybasic---.

Column 1, line 55, after "acids" delete ".";

Column 3, line 53, "1,9dicarboxylic" should read ---1,9-dicarboxylic---;

Column 5, line 3, "not" should read ---no---;

Column 6, line 19, "remoed" should read ---removed---.

In Claim 1, column 8, line 42, after "thylenediamine," should be inserted ---3 to 15 weight percent hexamethylenediamine,---.

Signed and Sealed this

*Twenty-seventh* Day of *December 1977*

[SEAL]

Attest:

RUTH C. MASON        LUTRELLE F. PARKER
*Attesting Officer*      *Acting Commissioner of Patents and Trademarks*